United States Patent Office 3,462,890
Patented Aug. 26, 1969

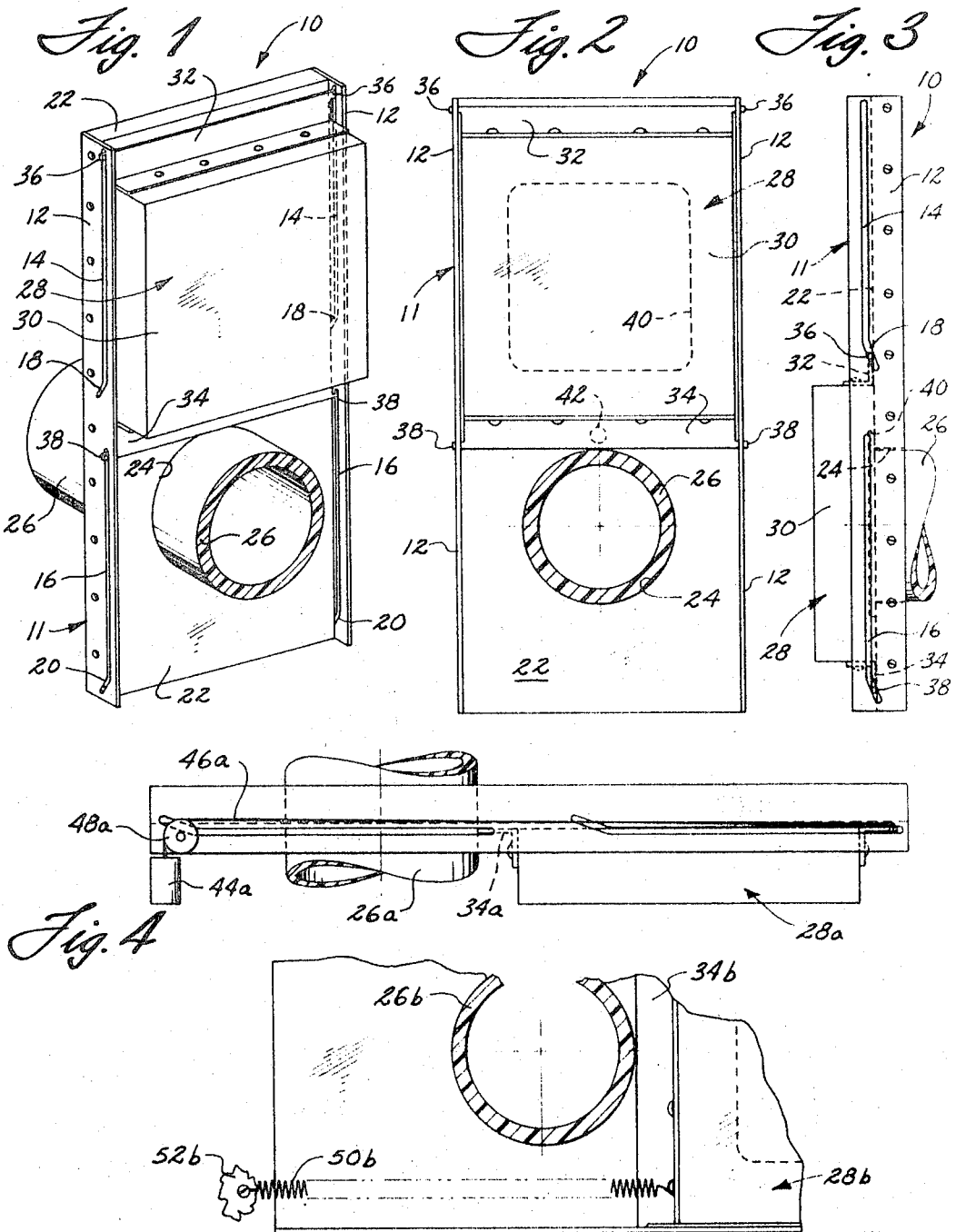

3,462,890
PLASTIC ARTICLE SEVERING AND INSULATING APPARATUS
James J. Blumenkranz, Hollywood, and Eugene H. Wise, Saugus, Calif., assignors to The Susquehanna Corporation, Fairfax County, Va., a corporation of Delaware
Filed Jan. 25, 1968, Ser. No. 700,528
Int. Cl. F16k 13/00, 17/00
U.S. Cl. 52—1                                    6 Claims

ABSTRACT OF THE DISCLOSURE

Apparatus for severing and insulating a plastic article such as a pipe section extending through a fire-resistant wall or floor to prevent the spread of fire by the progressive burning of the pipe section. The apparatus generally comprises a slidably movable, fire-resistant blade or baffle assembly which cuts through the plastic pipe section to interrupt it when it softens in the presecene of fire and before it ignites, and baffles or screens the open pipe section end, thereby insuring against the spread of fire via the pipe section from the hot side to the cold side of the fire-resistant wall or floor.

Background and summary of the invention

This invention relates to apparatus for preventing the spread of fire by the progressive burning of a plastic article or assembly such as a pipe system and, more particularly, to apparatus which is adapted to cut through a plastic pipe system to interrupt and baffle it when it softens in the presence of fire and before it ignites, to insure against the progressive burning of the pipe system through a fire-resistant wall or floor.

One problem that has occurred recently with plastic pipe systems made with thermoplastic materials, such as polypropylene, has been the transmission of fire through a fire-resistant wall or floor in a building by the progressive burning of a plastic pipe system extending through the wall or floor. A few approaches have been suggested for solving this problem. The first approach involves the use of plastic pipe and fittings of a material, such as polyvinyl chloride (PVC), that is less flammable than the polypropylene or other plastic material used for the piping system. Pipe and fittings of PVC are used for the portion of the polypropylene pipe system extending through the fire-resistant wall or floor to thus curb the spread of fire via the pipe system from one side of the wall or floor to the other. While this approach may be successful in preventing the spread of fire by the progressive burning of plastic pipe and fittings, it is subject to a significant disadvantage, namely, the difficulty of joining pipe and fittings formed of different plastic materials. A second approach is to insulate the thermoplastic pipe system with a thick layer of high temperature insulation to thereby prevent the burning of the pipe system in the presence of fire. This approach, however, is very time consuming and expensive.

Accordingly, it is an object of the present invention to provide apparatus for effectively preventing the spread of fire by the progressive burning of a plastic article or assembly such as a pipe system.

Another object is the provison of such apparatus which is so constructed and arranged as to cut through the plastic pipe system to interrupt and insulate it when it softens in the presence of fire, thereby preventing the progressive burning thereof.

A further object is to provide such an apparatus which may be easily mounted within a wall or floor to prevent the spread of fire through the wall or floor by the progressive burning of a plastic pipe system extending through it.

Still another object is the provision of such an apparatus which is simple in construction, economical to manufacture, easy to install, and efficient in operation.

Numerous other objects and advantages of present invention will be apparent as it is better understood from the following description, which, taken in connection with the accompanying drawing, discloses preferred embodiments thereof.

The above objects are accomplished by providing apparatus which prevents the spread of fire by the progressive burning of a plastic pipe system, by cutting through the pipe system when it softens in the presence of fire and by screening or baffling the open end of the cut pipe. The subject apparatus comprises a frame which may be easily mounted on or within the wall or floor of a building, an aperture in the frame to accommodate a section of a plastic piping system extending through the wall or floor, and a fire-resistant blade member slidably mounted on the frame for cutting through the plastic pipe section adjacent thereto when it softens in the presence of fire and before it ignites, thereby insuring against the spread of fire by the progressive burning of the pipe section from the hot side to the cold side of the wall or floor.

Referring to the drawings:

FIGURE 1 is a perspective view of apparatus for preventing the progressive burning of a plastic pipe system, constructed according to the principles of the present invention, and showing the blade member in operative position wherein it is adapted to cut through the adjacent portion of the plastic pipe system in the event it is exposed to fire;

FIGURE 2 is a front elevational view of the apparatus shown in FIGURE 1;

FIGURE 3 is a side elevational view of the apparatus shown in FIGURE 2, illustrating the blade member in a down position after it has cut through the adjacent portion of a plastic pipe system which has been softened in the presence of fire to thus prevent the progressive burning thereof;

FIGURE 4 is a side elevational view of a first modification of the subject apparatus which is suitable for floor installations; and FIGURE 5 is a front elevational view of a second modification of the subject apparatus.

Description of the preferred embodiments

As a preferred or exemplary embodiment of the present invention, FIGURES 1 and 2 illustrate apparatus 10 for preventing the spread of fire by the progressive burning of a plastic pipe system. The apparatus comprises a frame 11, formed of any suitable metallic or other material, having elongated side walls 12, each of which has upper and lower, substantially longitudinally extending guide slots 14 and 16, respectively, therein. The slots 14 and 16 terminate at their lower ends in inclined end portions 18 and 20, respectively, which extend downwardly and inwardly toward a center wall 22 extending between and rigidly attached to the side plates 12 of the frame 11. The center wall 22 is provided at its lower end with a circular aperture 24 that is adapted to receive therethrough a pipe section 26 which forms part of a plastic piping system (not shown).

A blade member 28 is disposed above the aperture 24 in the center wall 22 and is slidably mounted on the side walls 12 for longitudinal movement in the slots 14 and 16. The blade member 28 comprises an insulating plate 30 formed of any suitable high temperature, fire-resistant materials, such as the asbestos composition sold under the trademark Marinite by the Johns-Manville Company. Attached to the upper and lower ends of the insulating plate 30 are metal angle plates 32 and 34, respectively. The plate 32 extends upwardly from the upper end of the insulating plate 30 and is provided with a pair of laterally extending tabs 36 which are slidably engaged within the upper slots 14 of the side walls 12. The plate 34 extends downwardly from the lower end of the insulating plate 30 and is provided with a pair of laterally extending tabs 38 which are slidably engaged in the lower slots 16 of the side walls 12.

In use, the frame 11 is rigidly mounted in any suitable manner on or within a fire-resistant wall or floor (not shown) to be penetrated by the section 26 of a plastic piping system. In the embodiment shown in FIGURE 1, wherein the frame 11 is vertically oriented for a wall penetration, the blade member 28 is freely movable downwardly under the force of gravity and thus the lower plate 34 rests upon the adjacent upper surface of the pipe section 26. At normal ambient temperatures, the plastic pipe section 26 is sufficiently hard to resist any penetration by the plate 34.

As an illustative example, the pipe system (not shown) including the pipe section 26 may be formed of a thermoplastic material such as polypropylene which, depending on the characteristics of the polymer used, has a softening point of approximately 350° F., a melting point of approximately 400° F., and an ignition point of approximately 800 to 850° F. In the presence of fire, therefore, polypropylene and other thermoplastic pipe will soften and melt long before it ignites. This feature of such plastic pipe is utilized in the operation of the instant apparatus.

In operation, if a fire occurs on one side of a fire-resistant wall (not shown) within which the apparatus of FIGURES 1 and 2 is installed, the portion of the pipe section 26 exposed to the fire begins to soften when the ambient temperature reaches approximately the softening point of the plastic, or at approximately 350° F. in the case of polypropylene. Since the lower metal plate 34 in contact with the pipe section 26 is heated by the fire to the softening point of the plastic sooner than the pipe section itself, it serves as a hot cutting blade at that temperature and begins cutting through the pipe section under the force of gravity. When the pipe section 26 softens sufficiently in the presence of the fire, the weight of the insulating plate 30 and the plates 32 and 34 is sufficient to cause the blade member 28 to completely sever the pipe section 26 at a point adjacent to the center wall 22 of the frame 11, though the controlled downward movement of the angle plate tabs 36 and 38 in the guide slots 14 and 16, respectively, of the side walls 12.

Referring now to FIGURE 3, as the blade member 28 reaches the lower end of the frame 11, the insulating plate 30 is urged into tight engagement with the adjacent portion of the center wall 22 by the camming action of the lower inclined portions 18 and 20 of the slots 14 and 16 on the tabs 36 and 38, respectively. This serves to seal off the wall aperture 24 and insulate the portion of the pipe section 26 on the cold side of the center wall 22 from the fire on the opposite side thereof, thereby preventing progressive burning of the pipe section 26 beyond the fire-resistant wall in which the frame 11 is mounted. The insulating plate 30 is provided with a central recessed portion 40 on its inner side which is somewhat larger than the aperture 24 in the center wall 22 and is adapted to be positioned adjacent to the aperture 24 when the blade member 28 is in its down position (see FIGURE 3). The purpose for the recess 40 is to accommodate any rough edges of the severed pipe section 26 that may extend through the aperture 24 and beyond the center wall 22 toward the hot side thereof, thereby insuring that the insulating plate 30 tightly engages the center wall 22 to seal off the opening 24 when the blade member 28 is in its down position.

As an alternative, instead of bearing directly against the pipe section 26, the lower plate 34 of the blade member 28 may be restrained from contacting the pipe section at normal ambient temperatures by a fusible plug or link 42 (see FIGURE 2) between the plate 34 and the center wall 22. The fusible plug 42 would be adapted to fuse at a temperature below that of the softening point of the plastic pipe section 26 so as to release the blade member 28 for downward movement prior to the softening of the pipe section in the presence of fire.

FIGURES 4 and 5 disclose modified forms of the subject apparatus that are suitable for mounting on or within a fire-resistant floor to prevent the spread of fire by the progressive burning of a plastic pipe system extending therethrough. Since the blade member is horizontally disposed in floor installations, it is necessary to provide means for urging the blade member into engagement with the plastic pipe section extending through the floor. In FIGURE 4 one or more weights 44a are connected to the blade member 28a through a line and pulley arrangement 46a, 48a to urge the plate member 34a of the blade member into engagement with the plastic pipe section 26a adjacent thereto. In the embodiment shown in FIGURE 5, a helical coil spring 50b, attached to a portion 52b of the floor-supporting structure and to a portion of the blade member 28b, is utilized to urge the plate 34b of the blade member into engagement with the pipe section 26b adjacent thereto. Without departing from the spirit or scope of the instant invention, it is obvious that any other suitable means may be utilized to bias the blade member of the instant apparatus into engagement with the pipe section extending therethrough in a floor or wall penetration.

From the foregoing description, it is apparent that the subject apparatus may be used to prevent the progressive burning of any appropriate type of article or assembly, other than a pipe system, formed of a thermoplastic material.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodiments thereof.

We claim:

1. In combination, a thermoplastic pipe section and apparatus for preventing the progressive burning of said pipe section, said apparatus comprising:
    a frame having an aperture through which said pipe section extends,
    an insulated fire-resistant blade member having a cutting edge thereon movably mounted on said frame for movement from a first position exterior of the pipe section periphary to a second position covering said aperture, and
    means for moving said blade member from said first position to said second position, whereby when said pipe section is softened in the presence of fire, said means causes said blade member to cut through and sever said pipe section and move to said second position.

2. The apparatus of claim 1 wherein said frame comprises longitudinally extending guide slots, and said blade member comprises tabs slidably engaged in said slots for directing the movement of said blade member.

3. The apparatus of claim 2 wherein said frame comprises a center wall having said aperture therein and side walls having said slots therein, and wherein said slots terminate in end portions inclined toward said center wall which serve to urge said blade member into sealing engagement with the center wall portion surrounding said aperture when said blade member is in said second position.

4. The apparatus of claim 1 wherein said frame is substantially vertically oriented such that said blade member is movable downwardly from said first position to said second position, and wherein said moving means comprises the weight of said blade member acting on said pipe section under the force of gravity.

5. The apparatus of claim 1 wherein said moving means comprises a spring connected to said blade member and urging it toward said second position.

6. The apparatus of claim 1 wherein said moving means comprises a weight connected to said blade member and urging it toward said second position.

References Cited

UNITED STATES PATENTS

| | | | |
|---|---|---|---|
| 1,669,067 | 5/1928 | Pastore | 220—88 |
| 1,749,098 | 3/1930 | Boosey | 251—147 |
| 2,711,866 | 6/1955 | Bentz | 248—5 |
| 2,919,111 | 12/1959 | Nicolson | 166—55 |
| 3,273,632 | 9/1966 | McCabe | 160—235 |

FOREIGN PATENTS

| | | |
|---|---|---|
| 513,990 | 10/1939 | Great Britain. |

HENRY C. SUTHERLAND, Primary Examiner

U.S. Cl. X.R.

49—5, 428; 137—77; 251—147, 203